United States Patent
Kuno et al.

(10) Patent No.: US 9,436,106 B2
(45) Date of Patent: Sep. 6, 2016

(54) ELECTROPHOTOGRAPHIC PHOTOSENSITIVE MEMBER AND MANUFACTURING METHOD THEREFOR, PROCESS CARTRIDGE AND ELECTROPHOTOGRAPHIC APPARATUS INCLUDING THE ELECTROPHOTOGRAPHIC PHOTOSENSITIVE MEMBER, AND PHTHALOCYANINE CRYSTAL AND METHOD PRODUCING THEREFOR

(71) Applicant: CANON KABUSHIKI KAISHA, Tokyo (JP)

(72) Inventors: Junpei Kuno, Mishima (JP); Tsutomu Nishida, Mishima (JP); Masato Tanaka, Tagata-gun (JP); Masataka Kawahara, Mishima (JP); Kaname Watariguchi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/689,364

(22) Filed: Apr. 17, 2015

(65) Prior Publication Data

US 2015/0316862 A1    Nov. 5, 2015

(30) Foreign Application Priority Data

Apr. 30, 2014 (JP) ................................. 2014-094017
Mar. 24, 2015 (JP) ................................. 2015-061468

(51) Int. Cl.

| | |
|---|---|
| *G03G 5/047* | (2006.01) |
| *G03G 5/06* | (2006.01) |
| *C09B 47/04* | (2006.01) |
| *C09B 47/08* | (2006.01) |
| *G03G 15/00* | (2006.01) |

(Continued)

(52) U.S. Cl.
CPC ........... *G03G 5/0651* (2013.01); *C09B 47/045* (2013.01); *C09B 47/085* (2013.01); *G03G 5/00* (2013.01); *G03G 5/047* (2013.01); *G03G 5/06* (2013.01); *G03G 15/00* (2013.01); *G03G 15/75* (2013.01); *G03G 21/18* (2013.01)

(58) Field of Classification Search
CPC .......................... G03G 5/0696; G03G 5/0525
See application file for complete search history.

(56) References Cited

U.S. PATENT DOCUMENTS

| 5,194,353 A | 3/1993 | Tanaka et al. |
| 5,453,342 A | 9/1995 | Go et al. |
| 5,464,718 A | 11/1995 | Kashizaki et al. |

(Continued)

FOREIGN PATENT DOCUMENTS

| JP | 7-331107 A | 12/1995 |
| JP | 2011-94101 A | 5/2011 |

*Primary Examiner* — Peter Vajda
(74) *Attorney, Agent, or Firm* — Fitzpatrick, Cella, Harper & Scinto (57) ABSTRACT

Provided is an electrophotographic photosensitive member, including a photosensitive layer that includes a phthalocyanine crystal in which a compound represented by the following formula (1) is contained:

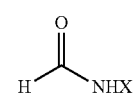

(1)

in the formula (1), X represents a vinyl group or a propyl group.

13 Claims, 2 Drawing Sheets (51) Int. Cl.
   *G03G 21/18*   (2006.01)
   *G03G 5/00*   (2006.01)

(56) References Cited

U.S. PATENT DOCUMENTS

| | | | |
|---|---|---|---|
| 5,666,589 A | 9/1997 | Yoshinaga et al. |
| 5,811,212 A | 9/1998 | Tanaka |
| 5,834,149 A | 11/1998 | Tambo et al. |
| 6,040,100 A | 3/2000 | Tanaka et al. |
| 6,139,997 A | 10/2000 | Tanaka et al. |
| 6,245,472 B1 | 6/2001 | Tanaka |
| 6,472,524 B2 | 10/2002 | Tanaka |
| 6,833,227 B2 | 12/2004 | Tanaka |
| 7,718,331 B2 | 5/2010 | Uematsu et al. |
| 8,088,541 B2 | 1/2012 | Tanaka et al. |
| 8,415,078 B2 | 4/2013 | Tanaka et al. |
| 8,518,615 B2 | 8/2013 | Tanaka |
| 8,617,777 B2 | 12/2013 | Tanaka |
| 8,765,335 B2 | 7/2014 | Tanaka et al. |
| 8,841,052 B2 | 9/2014 | Watariguchi et al. |
| 8,974,991 B2 | 3/2015 | Kawahara et al. |
| 2013/0137032 A1* | 5/2013 | Tanaka ............ C09B 67/0026 430/127 |
| 2014/0093281 A1 | 4/2014 | Takahashi et al. |
| 2014/0106269 A1 | 4/2014 | Tanaka et al. |
| 2014/0141362 A1 | 5/2014 | Watariguchi et al. |
| 2014/0170540 A1 | 6/2014 | Tanaka |
| 2014/0170541 A1 | 6/2014 | Tanaka |
| 2014/0170542 A1 | 6/2014 | Tanaka |
| 2014/0170543 A1 | 6/2014 | Tanaka |
| 2014/0308606 A1 | 10/2014 | Tanaka et al. |
| 2014/0363759 A1 | 12/2014 | Watariguchi et al. |
| 2015/0093693 A1 | 4/2015 | Watariguchi et al. |

* cited by examiner

ELECTROPHOTOGRAPHIC PHOTOSENSITIVE MEMBER AND MANUFACTURING METHOD THEREFOR, PROCESS CARTRIDGE AND ELECTROPHOTOGRAPHIC APPARATUS INCLUDING THE ELECTROPHOTOGRAPHIC PHOTOSENSITIVE MEMBER, AND PHTHALOCYANINE CRYSTAL AND METHOD PRODUCING THEREFOR

BACKGROUND OF THE INVENTION

1. Field of the Invention

The present invention relates to an electrophotographic photosensitive member and a manufacturing method therefor, a process cartridge and an electrophotographic apparatus each including the electrophotographic photosensitive member, and a phthalocyanine crystal and a method producing therefor.

2. Description of the Related Art

An electrophotographic photosensitive member to be used in an electrophotographic apparatus such as a copying machine or a laser beam printer is required to have sufficient sensitivity to image exposure light. It has been known that an azo pigment and a phthalocyanine pigment, each of which is used as a charge generating material for the electrophotographic photosensitive member, exhibit high sensitivity to light having wavelengths in a wide range.

In addition, in recent years, there has been a demand for an increase in image quality as typified by colorization. Due to the colorization, the number of halftone images and solid images as found in photographs is increasing, and the image quality thereof never stops improving. In the case of a color printer and a color copying machine, the acceptable range with respect to a so-called positive ghost image or the like is becoming significantly narrow as compared to the acceptable range of a black-and-white printer and a black-and-white copying machine. The positive ghost image refers to a phenomenon in which the density of only a portion of one image irradiated with light becomes high in a halftone image in the next rotation. The ghost image is considered to be caused as follows. A hole that is one of carriers generated from the charge generating material used in the electrophotographic photosensitive member is injected into a charge transport layer, and thereafter, an electron is liable to remain in a charge generating layer to serve as a memory.

Japanese Patent Application Laid-Open No. H07-331107 discloses a hydroxygallium phthalocyanine crystal having a feature of containing at least one polar organic solvent selected from a compound having an amide group, a compound having a sulfoxide group, and an organic amine.

SUMMARY OF THE INVENTION

As a result of the study conducted by the inventors of the present invention, it was found that the hydroxygallium phthalocyanine crystal disclosed in Japanese Patent Application Laid-Open No. H07-331107 has not solved the above-mentioned problem.

It is an object of the present invention to provide an electrophotographic photosensitive member capable of outputting an image having a positive ghost image suppressed and a manufacturing method therefor. In addition, it is an object of the present invention to provide a process cartridge and an electrophotographic apparatus including the electrophotographic photosensitive member.

Further, it is another object of the present invention to provide a phthalocyanine crystal in which a particular amide compound is contained, and a method producing therefor.

According to one embodiment of the present invention, there is provided an electrophotographic photosensitive member, including a support and a photosensitive layer formed on the support. The photosensitive layer includes a phthalocyanine crystal in which a compound represented by the following formula (1) is contained:

(1)

in the formula (1), X represents a vinyl group or a propyl group.

According to another embodiment of the present invention, there is provided a process cartridge, including: the above-mentioned electrophotographic photosensitive member; and at least one unit selected from the group consisting of a charging unit, a developing unit, and a cleaning unit. The electrophotographic photosensitive member and the at least one unit are integrally supported, and the process cartridge is removably mounted onto a main body of an electrophotographic apparatus.

According to still another embodiment of the present invention, there is provided an electrophotographic apparatus, including: the above-mentioned electrophotographic photosensitive member; a charging unit; an image exposing unit; a developing unit; and a transferring unit.

According to still another embodiment of the present invention, there is provided a phthalocyanine crystal in which a compound represented by the formula (1) is contained.

According to still another embodiment of the present invention, there is provided a method for producing the phthalocyanine crystal in which a particular amide compound is contained. The method includes a step of performing crystal transformation of a phthalocyanine by addition the compound represented by the formula (1) thereto with milling treatment.

According to still another embodiment of the present invention, there is provided a method for manufacturing an electrophotographic photosensitive member, the electrophotographic photosensitive member including a support and a photosensitive layer formed on the support. The method includes the steps of: producing the phthalocyanine crystal by the above-mentioned method for producing the phthalocyanine crystal; and forming a coating of an application liquid for a photosensitive layer containing the phthalocyanine crystal, followed by drying the coating to form the photosensitive layer.

According to the embodiments of the present invention, it is possible to provide the electrophotographic photosensitive member having a positive ghost image suppressed and the manufacturing method therefor, and the process cartridge and electrophotographic apparatus including the electrophotographic photosensitive member.

It is also possible to provide the phthalocyanine crystal in which a particular amide compound is contained, and the method producing therefor.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

As described above, the electrophotographic photosensitive member of the present invention includes a support and a photosensitive layer formed on the support. In addition, the photosensitive layer includes a phthalocyanine crystal in which a compound represented by the following formula (1) is contained:

(1)

in the formula (1), X represents a vinyl group or a propyl group.

As phthalocyanine forming the phthalocyanine crystal in which the compound represented by the formula (1) is contained, for example, any phthalocyanines such as metal-free phthalocyanine and metal phthalocyanine that may include an axial ligand can be used, and those phthalocyanines may each have a substituent. Of those, in particular, oxytitanium phthalocyanine and gallium phthalocyanine have excellent sensitivity characteristics but have a problem in that a produced photocarrier is liable to remain in the photosensitive layer to cause a positive ghost image or the like. The present invention effectively solves this problem, and hence those phthalocyanines are preferred.

An example of the gallium phthalocyanine is a gallium phthalocyanine having a halogen atom, a hydroxy group, or an alkoxy group as an axial ligand at a gallium atom in a molecule thereof. A gallium phthalocyanine having a substituent such as a halogen atom in its phthalocyanine ring is also permitted.

Of such gallium phthalocyanine crystals, a hydroxygallium phthalocyanine crystal, a chlorogallium phthalocyanine crystal, a bromogallium phthalocyanine crystal, and an iodogallium phthalocyanine crystal each having excellent sensitivity are preferred. Of those, hydroxygallium phthalocyanine crystal is particularly preferred. In the hydroxygallium phthalocyanine crystal, a gallium atom has a hydroxy group as an axial ligand. In the chlorogallium phthalocyanine crystal, a gallium atom has a chlorine atom as an axial ligand. In the bromogallium phthalocyanine crystal, a gallium atom has a bromine atom as an axial ligand. In the iodogallium phthalocyanine crystal, a gallium atom has an iodine atom as an axial ligand.

In addition, from the viewpoint of suppressing image failure due to the ghost phenomenon, a hydroxygallium phthalocyanine crystal having peaks at Bragg angles $2\theta \pm 0.2°$ of 7.4° and 28.3° in CuKα X-ray diffraction is more preferred.

From the viewpoint of suppressing the positive ghost, the content of the compound represented by the formula (1) contained in the phthalocyanine crystal is preferably 0.01 mass % or more and 20 mass % or less, particularly preferably 0.1 mass % or more and 1.9 mass % or less.

The phthalocyanine crystal in which the compound represented by the formula (1) is contained means that the compound represented by the formula (1) is taken in the crystal.

When the compound represented by the formula (1) is taken in the phthalocyanine crystal, a charge trap site is cancelled by the intramolecular polarity of the compound. Thus, it is considered that the ghost is suppressed in the electrophotographic photosensitive member of the present invention.

A method for producing the phthalocyanine crystal in which the compound represented by the formula (1) is contained is described.

The phthalocyanine crystal in which the compound represented by the formula (1) is contained is obtained by a crystal transformation step of performing crystal transformation of the phthalocyanine crystal by addition the compound represented by the formula (1) thereto with milling treatment. It is preferred that the phthalocyanine to be used in the milling treatment be phthalocyanine obtained by an acid pasting method.

The milling treatment to be performed in the crystal transformation step refers to treatment performed through use of a milling device such as a sand mill or a ball mill together with a dispersant such as glass beads, steel beads, or alumina balls. The amount of the compound represented by the formula (1) to be added in the milling treatment is preferably from 5 to 30 times as large as that of the phthalocyanine on a mass basis.

In the present invention, whether the phthalocyanine crystal of the present invention contains therein the compound represented by the formula (1) was determined by analyzing data on the $^1$H-NMR measurement of the resultant phthalocyanine crystal.

In the present invention, the X-ray diffraction and $^1$H-NMR measurement of the phthalocyanine crystal were performed under the following conditions.

[Powder X-Ray Diffraction Measurement]
Used measuring apparatus: X-ray diffractometer (trade name: RINT-TTRII) manufactured by Rigaku Corporation
X-ray tube bulb: Cu
Tube voltage: 50 KV
Tube current: 300 mA
Scanning method: 2θ/θ scan
Scanning rate: 4.0°/min
Sampling interval: 0.02°
Start angle (2θ): 5.0°
Stop angle (2θ): 40.0°
Attachment: standard sample holder
Filter: not used
Incident monochrome: used
Counter monochromator: not used
Divergence slit: open
Divergence longitudinal restriction slit: 10.00 mm
Scattering slit: open Light-receiving slit: open
Flat monochromator: used
Counter: scintillation counter
[$^1$H-NMR Measurement]
Used measuring apparatus: trade name: AVANCE III 500 manufactured by BRUKER
Solvent: deuterated sulfuric acid ($D_2SO_4$)
Number of Scans (NS): 2000

The phthalocyanine crystal in which the compound represented by the formula (1) is contained is excellent in function as a photoconductor and is hence applicable to a solar cell, a sensor, a switching element, or the like as well as to an electrophotographic photosensitive member.

Next, the case where the phthalocyanine crystal in which the compound represented by the formula (1) is contained is applied as a charge generating material in an electrophotographic photosensitive member is described.

The electrophotographic photosensitive member of the present invention includes a support and a photosensitive layer formed on the support. As the photosensitive layer, there are given a photosensitive layer formed of a single layer containing both the charge generating material and a charge transport material (single-layer photosensitive layer), and a photosensitive layer obtained by laminating a charge generating layer containing the charge generating material and a charge transport layer containing the charge transport material (laminated photosensitive layer). Of those, a laminated photosensitive layer including a charge generating layer and a charge transport layer formed on the charge generating layer is preferred.

The support to be used in the present invention is preferably a support having conductivity (conductive support). As the support, there may be used, for example, a support made of a metal or alloy such as aluminum, an aluminum alloy, copper, zinc, stainless, vanadium, molybdenum, chromium, titanium, nickel, indium, gold, or platinum. In addition, there may be used: a plastic (e.g., polyethylene, polypropylene, polyvinyl chloride, polyethylene terephthalate, an acrylic resin, or polyfluoroethylene) having a layer of aluminum, an aluminum alloy, indium oxide, tin oxide, or an indium oxide-tin oxide alloy formed into a film by vacuum vapor deposition; a support obtained by coating a plastic or the above-mentioned support with conductive particles (e.g., aluminum particles, titanium oxide particles, tin oxide particles, zinc oxide particles, carbon black, or silver particles) and a binder resin; a support obtained by impregnating a plastic or paper with conductive particles; a plastic having a conductive polymer; and the like.

In the present invention, an undercoat layer having a barrier function and an adhesion function (sometimes referred to as "barrier layer" or "intermediate layer") may be formed between the support and the photosensitive layer. The undercoat layer can be formed by: forming a coating of an application liquid for an undercoat layer obtained by mixing a binder resin and a solvent; and drying the coating.

As the binding resin, there may be used polyvinyl alcohol, polyethylene oxide, ethyl cellulose, methyl cellulose, casein, polyamides (e.g., nylon 6, nylon 66, nylon 610, a copolymer nylon, and an N-alkoxymethylated nylon), polyurethane, glue, aluminum oxide, gelatin, and the like. The thickness of the undercoat layer is from 0.1 to 10 µm, preferably from 0.5 to 5 µm.

When the single-layer photosensitive layer is formed, the phthalocyanine crystal in which the compound represented by the formula (1) is contained is used as the charge generating material, and the charge generating material and the charge transport material are mixed into a binder resin solution to prepare an application liquid for a photosensitive layer. The application liquid for a photosensitive layer is applied onto the support, and the resultant coating is dried, to thereby form the single-layer photosensitive layer.

When the laminated photosensitive layer is formed, the charge generating layer can be formed by: applying an application liquid for a charge generating layer obtained by dispersing the phthalocyanine crystal in which the compound represented by the formula (1) is contained in a binder resin solution; and drying the resultant coating. Alternatively, the charge generating layer can be formed by vapor deposition.

When the laminated photosensitive layer is formed, the charge transport layer can be formed by: applying an application liquid for a charge transport layer obtained by dissolving the charge transport material and a binder resin into a solvent onto the charge generating layer; and drying the resultant coating.

Examples of the charge transport material include a triarylamine-based compound, a hydrazone-based compound, a stilbene-based compound, a pyrazoline-based compound, an oxazole-based compound, a thiazole-based compound, and a triallylmethane-based compound.

Examples of the binder resin to be used for the single-layer photosensitive layer, the charge generating layer, or the charge transport layer include resins such as polyester, an acrylic resin, polyvinylcarbazole, a phenoxy resin, polycarbonate, polyvinyl butyral, polystyrene, polyvinyl acetate, polysulfone, polyarylate, polyvinylidene chloride, an acrylonitrile copolymer, and polyvinyl benzal.

An application method such as a dipping method, a spray coating method, a spinner coating method, a bead coating method, a blade coating method, or a beam coating method can be used as a method of applying the photosensitive layer.

When the photosensitive layer is of a single-layer type, its thickness is preferably from 4 to 40 µm, more preferably from 5 to 25 µm.

When the photosensitive layer is of a laminated type, the thickness of the charge generating layer is preferably from 0.01 to 10 µm, more preferably from 0.1 to 3 µm. In addition, the thickness of the charge transport layer is preferably from 4 to 40 µm, more preferably from 5 to 25 µm.

When the photosensitive layer is of a laminated type, the content of the charge generating material in the charge generating layer is preferably from 20 to 90 mass %, more preferably from 50 to 80 mass % with respect to the total mass of the charge generating layer. In addition, the content of the charge transport material in the charge generating layer is preferably from 20 to 80 mass %, more preferably from 30 to 70 mass % with respect to the total mass of the charge transport layer.

When the photosensitive layer is of a single-layer type, the content of the charge generating material is preferably from 3 to 30 mass % with respect to the total mass of the photosensitive layer. In addition, the content of the charge transport material is preferably from 30 to 70 mass % with respect to the total mass of the photosensitive layer.

When the phthalocyanine crystal according to the present invention is used as a charge generating material, the material can be mixed with any other charge generating material before use. In this case, the content of the phthalocyanine crystal is preferably 50 mass % or more with respect to all charge generating materials.

A protective layer may be formed on the photosensitive layer as required. The protective layer can be formed by: forming a coating of an application liquid for a protective layer, which is obtained by dissolving a binder resin in a solvent; and drying the coating. Examples of the binder resin include polyvinyl butyral, polyester, polycarbonate (e.g., polycarbonate Z or modified polycarbonate), nylon, polyimide, polyarylate, polyurethane, a styrene-butadiene copolymer, a styrene-acrylic acid copolymer, and a styrene-acrylonitrile copolymer. The thickness of the protective layer is preferably from 0.05 to 20 µm.

A conductive particle, a UV absorber, or the like may be incorporated into the protective layer. Examples of the conductive particle include metal oxide particles such as a tin oxide particle.

Figure 1:
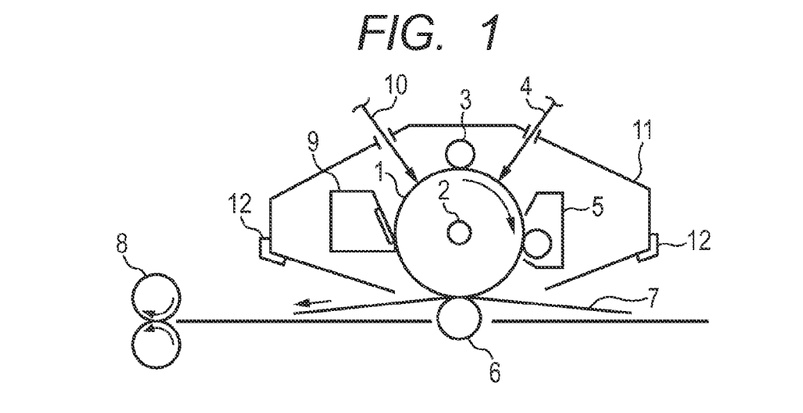
FIG. 1 is a schematic view illustrating an example of a configuration of an electrophotographic apparatus including a process cartridge including an electrophotographic photosensitive member of the present invention.

FIG. 1 is a schematic view illustrating an example of the configuration of an electrophotographic apparatus including a process cartridge including the electrophotographic photosensitive member of the present invention.

A cylindrical (drum-shaped) electrophotographic photosensitive member 1 is rotationally driven about an axis 2 in a direction indicated by an arrow at a predetermined peripheral speed (process speed).

The surface of the electrophotographic photosensitive member 1 is charged to a predetermined positive or negative electric potential by a charging unit 3 during the rotation process. Next, the charged surface of the electrophotographic photosensitive member 1 is irradiated with image exposure light 4 from an image exposing unit (not shown) and thus an electrostatic latent image corresponding to target image information is formed. The image exposure light 4 is, for example, light to be output from the image exposing unit such as a slit exposure or a laser beam scanning exposure, the light having intensity modulated in correspondence with a time-series electrical digital image signal of the target image information.

The electrostatic latent image formed on the surface of the electrophotographic photosensitive member 1 is developed (subjected to normal development or reversal development) with toner stored in a developing unit 5. Thus, a toner image is formed on the surface of the electrophotographic photosensitive member 1. The toner image formed on the surface of the electrophotographic photosensitive member 1 is transferred onto a transfer material 7 by a transferring unit 6. At this time, a bias voltage opposite in polarity to the charge which the toner possesses is applied from a bias power source (not shown) to the transferring unit 6. In addition, when the transfer material 7 is paper, the transfer material 7 is taken out of a sheet-feeding portion (not shown), and is then fed into a gap between the electrophotographic photosensitive member 1 and the transferring unit 6 in synchronization with the rotation of the electrophotographic photosensitive member 1.

The transfer material 7 onto which the toner image has been transferred from the electrophotographic photosensitive member 1 is separated from the surface of the electrophotographic photosensitive member 1 and then conveyed to an image fixing unit 8 where the transfer material is subjected to treatment for fixing the toner image. Thus, the transfer material is printed out as an image-formed product (print or copy) to the outside of the electrophotographic apparatus.

The surface of the electrophotographic photosensitive member 1 after the transfer of the toner image onto the transfer material 7 is subjected to the removal of a deposit such as the toner (transfer residual toner) by a cleaning unit 9, thereby being cleaned. A cleaner-less system has been developed in recent years and hence the transfer residual toner can be directly removed with developing equipment or the like. Further, the surface of the electrophotographic photosensitive member 1 is subjected to antistatic treatment by pre-exposure light 10 from a pre-exposing unit (not shown) before being repeatedly used for image formation. It should be noted that when the charging unit 3 is a contact charging unit using a charging roller or the like, the pre-exposing unit is not necessarily needed.

In the present invention, a plurality of components out of the components such as the electrophotographic photosensitive member 1, the charging unit 3, the developing unit 5, and the cleaning unit 9 can be stored in a container and integrally supported to form a process cartridge. The process cartridge can be removably mounted onto the main body of the electrophotographic apparatus. For example, at least one selected from the charging unit 3, the developing unit 5, and the cleaning unit 9 is integrally supported with the electrophotographic photosensitive member 1 to form a cartridge. Then, the cartridge can be used as a process cartridge 11 removably mounted onto the main body of the electrophotographic apparatus with a guiding unit 12 such as a rail of the main body of the electrophotographic apparatus.

When the electrophotographic apparatus is a copying machine or a printer, the image exposure light 4 may be reflected light or transmitted light from an original. Alternatively, the light may be light radiated by, for example, scanning with a laser beam, the driving of an LED array, or the driving of a liquid crystal shutter array to be performed according to a signal turned from the original read with a sensor.

The electrophotographic photosensitive member 1 of the present invention is also widely applicable to the fields of application of electrophotography such as a laser beam printer, a CRT printer, an LED printer, a FAX, a liquid crystal printer, and laser plate making.

EXAMPLES

Hereinafter, the present invention is described in more detail by way of specific examples. However, the present invention is not limited to these examples. It should be noted that the term "part(s)" in the examples refers to "part(s) by mass". The thickness of each layer of any one of the electrophotographic photosensitive members of Examples and Comparative Examples was determined with an eddy-current thickness meter (Fischerscope manufactured by Fischer Instruments), or was determined from its mass per unit area by specific gravity conversion.

Example 1-1

Hydroxygallium phthalocyanine was produced as follows in the same way as in Synthesis Example 1 and Example 1-1 disclosed in Japanese Patent Application Laid-Open No. 2011-94101. 5.46 parts of phthalonitrile and 45 parts of α-chloronaphthalene were supplied to a reaction vessel under a nitrogen flow. The mixture was heated to a temperature of 30° C. and maintained at this temperature. Then, 3.75 parts of gallium trichloride was supplied to the resultant at this temperature (30° C.). The moisture value of the mixed solution at the time of the supply was 150 ppm. After that, the temperature was raised to 200° C. Next, the resultant was reacted at a temperature of 200° C. for 4.5 hours in an atmosphere of a nitrogen flow and then cooled. When the temperature reached 150° C., the product was filtered. The resultant filtration residue was subjected to dispersion-washing with N,N-dimethylformamide at a temperature of 140° C. for 2 hours and then filtered. The resultant filtration residue was washed with methanol and dried to obtain 4.65 parts (yield: 71%) of a chlorogallium phthalocyanine pigment. Then, 4.65 parts of the resultant chlorogallium phthalocyanine pigment was dissolved in 139.5 parts of concentrated sulfuric acid at a temperature of 10° C. The resultant was dropped into 620 parts of iced water with stirring to be reprecipitated and filtered through use of a filter press. The resultant wet cake (filtration residue) was subjected to dispersion-washing with 2% aqueous ammonia and filtered through use of the filter press. Then, the resultant wet cake (filtration residue) was subjected to dispersion-washing with ion-exchanged water and subjected to a filtering step using the filter press repeatedly three times. Thus, hydroxygallium phthalocyanine (water-containing hydroxygallium phthalocyanine) containing 23% of a solid content was obtained. 6.6 kg of the resultant hydroxygallium phthalocyanine (water-containing hydroxygallium phthalocyanine) was irradiated with a microwave through use of a hyper-dry drier (trade name: HD-06R, frequency (oscillation frequency): 2,455 MHz±15 MHz, manufactured by Biocon (Japan) Ltd.) to dry the hydroxygallium phthalocyanine.

Figure 2:
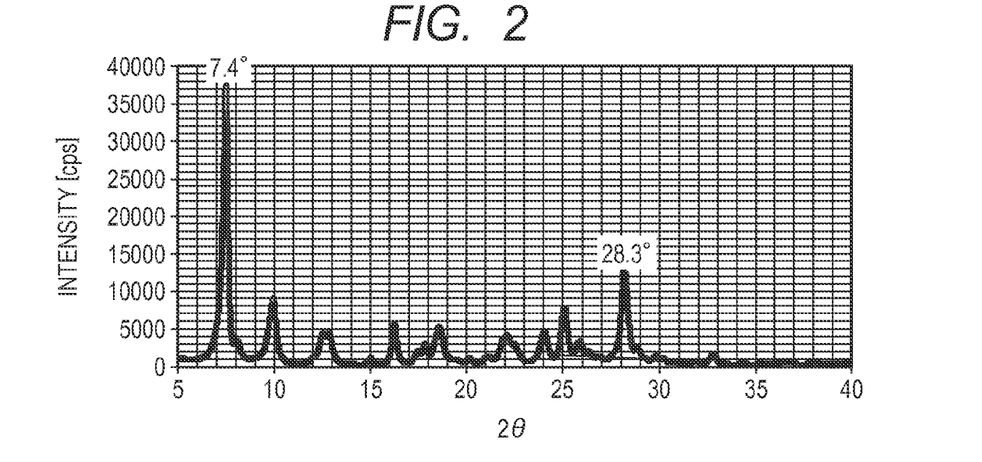
FIG. 2 is a powder X-ray diffraction spectrum of a hydroxygallium phthalocyanine crystal obtained in Example 1-1.

0.5 part of the hydroxygallium phthalocyanine thus obtained and 9.5 parts of N-vinylformamide (product code: V0106, manufactured by Tokyo Chemical Industry Co., Ltd.) represented by the following formula:

were subjected to milling treatment with a ball mill together with 15 parts of glass beads each having a diameter of 0.8 mm at room temperature (23° C.) for 200 hours. In this case, the milling treatment was performed by using a standardized bottle (product code: PS-6, manufactured by Hakuyo Glass Co., Ltd.) as a container under the condition that the container rotated 60 times per minute. A gallium phthalocyanine crystal was taken out from the resultant dispersion liquid through use of tetrahydrofuran and filtered. The top of the filter was sufficiently washed with tetrahydrofuran. The filtration residue was dried under vacuum to obtain 0.45 part of a hydroxygallium phthalocyanine crystal. FIG. 2 shows a powder X-ray diffraction spectrum of the resultant crystal. It is understood from FIG. 2 that the powder X-ray diffraction spectrum has peaks at Bragg angles 2θ±0.2° of 7.4° and 28.3° in CuKα characteristic X-ray diffraction. This crystal was dissolved in deuterated sulfuric acid and subjected to $^1$H-NMR measurement. As a result, a peak derived from N-vinylformamide was observed besides the peaks derived from the phthalocyanine molecule. N-vinylformamide is a liquid and is compatible with tetrahydrofuran, and hence it is understood that N-vinylformamide is contained in the phthalocyanine crystal. The content of N-vinylformamide in the hydroxygallium phthalocyanine crystal was 1.8 mass %, the value being calculated from proton ratios.

Example 1-2

A hydroxygallium phthalocyanine crystal was obtained in the same way as in Example 1-1 except that in Example 1-1, the milling treatment time was set to 600 hours. A powder X-ray diffraction spectrum of the resultant crystal had peaks at Bragg angles 2θ±0.2° of 7.4° and 28.3° in CuKα characteristic X-ray diffraction in the same way as in FIG. 2. The resultant crystal was subjected to the $^1$H-NMR measurement in the same way as in Example 1-1. As a result, it was confirmed that the crystal contained 1.5 mass % of N-vinylformamide.

Example 1-3

A hydroxygallium phthalocyanine crystal was obtained in the same way as in Example 1-1 except that in Example 1-1, the milling treatment time was set to 100 hours. A powder X-ray diffraction spectrum of the resultant crystal had strong peaks at Bragg angles 2θ±0.2° of 7.4° and 28.3° in CuKα characteristic X-ray diffraction in the same way as in FIG. 2. The resultant crystal was subjected to the $^1$H-NMR measurement in the same way as in Example 1-1. As a result, it was confirmed that the crystal contained 2.1 mass % of N-vinylformamide.

Example 1-4

Figure 3:
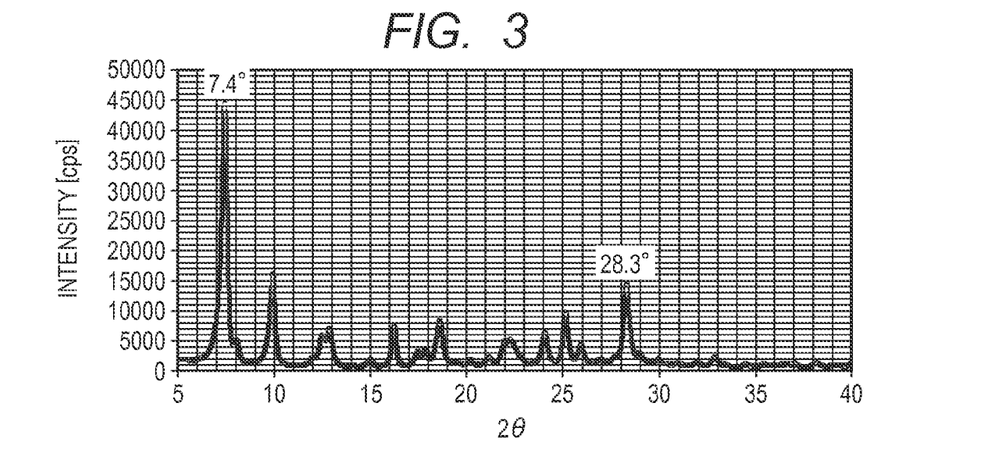
FIG. 3 is a powder X-ray diffraction spectrum of a hydroxygallium phthalocyanine crystal obtained in Example 1-4.

A hydroxygallium phthalocyanine crystal was obtained by the same treatment as that of Example 1-1 except that in Example 1-1, N-n-propylformamide (manufactured by Konan Chemical Industry Co., Ltd.) represented by the following formula:

was used in place of the N-vinylformamide. FIG. 3 shows a powder X-ray diffraction spectrum of the resultant crystal. It is understood from FIG. 3 that the powder X-ray diffraction spectrum has peaks at Bragg angles 2θ±0.2° of 7.4° and 28.3° in CuKα characteristic X-ray diffraction. The resultant crystal was subjected to the $^1$H-NMR measurement in the same way as in Example 1-1. As a result, it was confirmed that the crystal contained 2.4 mass % of N-n-propylformamide.

Example 1-5

A hydroxygallium phthalocyanine crystal was obtained in the same way as in Example 1-4 except that in Example 1-4, the milling treatment time was set to 600 hours. A powder X-ray diffraction spectrum of the resultant crystal had peaks at Bragg angles 2θ±0.2° of 7.4° and 28.3° in CuKα characteristic X-ray diffraction in the same way as in FIG. 3. The resultant crystal was subjected to the $^1$H-NMR measurement in the same way as in Example 1-1. As a result, it was confirmed that the crystal contained 1.6 mass % of N-n-propylformamide.

Example 1-6

A hydroxygallium phthalocyanine crystal was obtained in the same way as in Example 1-4 except that in Example 1-4, the milling treatment time was set to 1,000 hours. A powder X-ray diffraction spectrum of the resultant crystal had peaks at Bragg angles 2θ±0.2° of 7.4° and 28.3° in CuKα characteristic X-ray diffraction in the same way as in FIG. 3. The resultant crystal was subjected to the $^1$H-NMR measurement in the same way as in Example 1-1. As a result, it was confirmed that the crystal contained 1.4 mass % of N-n-propylformamide.

Example 1-7

A hydroxygallium phthalocyanine crystal was obtained by the same way as in Example 1-6 except that in Example 1-6, 3.2 parts of N,N-dimethylformamide (product code: D0722, manufactured by Tokyo Chemical Industry Co., Ltd.) and 6.3 parts of the N-n-propylformamide were used in place of 9.5 parts of the N-n-propylformamide. A powder X-ray diffraction spectrum of the resultant crystal had peaks at Bragg angles 2θ±0.2° of 7.4° and 28.3° in CuKα characteristic X-ray diffraction in the same way as in FIG. 3. The resultant crystal was subjected to the $^1$H-NMR measurement in the same way as in Example 1-1. As a result, it was confirmed that the crystal contained 0.8 mass % of N-n-propylformamide.

Comparative Example 1-1

A hydroxygallium phthalocyanine crystal was obtained by the same treatment as that of Example 1-3 except that in Example 1-3, N,N-dimethylformamide (product code: D0722, manufactured by Tokyo Chemical Industry Co., Ltd.) was used in place of N-vinylformamide. In the production process of the hydroxygallium phthalocyanine crystal obtained in Comparative Example 1-1, none of the compounds represented by the formula (1) was used. Therefore, the hydroxygallium phthalocyanine crystal obtained in Comparative Example 1-1 did not contain any of the compounds represented by the formula (1). The resultant crystal was subjected to the $^1$H-NMR measurement in the same way as in Example 1-1. As a result, it was confirmed that the crystal contained 2.1 mass % of N,N-dimethylformamide.

Comparative Example 1-2

A hydroxygallium phthalocyanine crystal was obtained by the same treatment as that of Example 1-3 except that in Example 1-3, dimethyl sulfoxide (product code: D0798, manufactured by Tokyo Chemical Industry Co., Ltd.) was used in place of N-vinylformamide. In the production process of the hydroxygallium phthalocyanine crystal obtained in Comparative Example 1-2, none of the compounds represented by the formula (1) was used. Therefore, the hydroxygallium phthalocyanine crystal obtained in Comparative Example 1-2 did not contain any of the compounds represented by the formula (1). The resultant crystal was subjected to the $^1$H-NMR measurement in the same way as in Example 1-1. As a result, it was confirmed that the crystal contained 2.4 mass % of dimethyl sulfoxide.

Comparative Example 1-3

A hydroxygallium phthalocyanine crystal was obtained by the same treatment as that of Example 1-3 except that in Example 1-3, 1-methyl-2-pyrrolidone (product code: M0418, manufactured by Tokyo Chemical Industry Co., Ltd.) was used in place of N-vinylformamide. In the production process of the hydroxygallium phthalocyanine crystal obtained in Comparative Example 1-3, none of the compounds represented by the formula (1) was used. Therefore, the hydroxygallium phthalocyanine crystal obtained in Comparative Example 1-3 did not contain any of the compounds represented by the formula (1). The resultant crystal was subjected to the $^1$H-NMR measurement in the same way as in Example 1-1. As a result, it was confirmed that the crystal contained 2.9 mass % of 1-methyl-2-pyrrolidone.

Example 2-1

A solution formed of 60 parts of barium sulfate particles coated with tin oxide (trade name: Passtran PC1, manufactured by MITSUI MINING & SMELTING CO., LTD.), 15 parts of titanium oxide particles (trade name: TITANIX JR, manufactured by TAYCA CORPORATION), 43 parts of a resole-type phenol resin (trade name: Phenolite J-325, manufactured by DIC Corporation, solid content: 70 mass %), 0.015 part of a silicone oil (trade name: SH28PA, manufactured by Toray Silicone Co., Ltd.), 3.6 parts of a silicone resin (trade name: Tospearl 120, manufactured by Toshiba Silicone Co., Ltd.), 50 parts of 2-methoxy-1-propanol, and 50 parts of methanol was subjected to dispersion treatment in a ball mill for 20 hours. Thus, an application liquid for a conductive layer was prepared.

The application liquid for a conductive layer was applied onto an aluminum cylinder (having a diameter of 24 mm) as a support by immersion and then the resultant coating was dried for 30 minutes at 140° C. Thus, a conductive layer having a thickness of 15 μm was formed.

Next, 10 parts of a copolymer nylon resin (trade name: Amilan CM8000, manufactured by Toray Industries, Inc.) and 30 parts of a methoxymethylated 6-nylon resin (trade name: Toresin EF-30T, manufactured by Teikoku Kagaku Sangyo K.K.) were dissolved in a mixed solvent of 400 parts of methanol and 200 parts of n-butanol. Thus, an application liquid for an undercoat layer was prepared.

The application liquid for an undercoat layer was applied onto the conductive layer by immersion and then the resultant coating was dried. Thus, an undercoat layer having a thickness of 0.5 μm was formed.

Next, 10 parts of the hydroxygallium phthalocyanine crystal (charge generating material) obtained in Example 1-1, 5 parts of polyvinyl butyral (trade name: S-LEC BX-1, manufactured by SEKISUI CHEMICAL CO., LTD.), and 250 parts of cyclohexanone were loaded into a sand mill using glass beads each having a diameter of 1 mm, and were then subjected to dispersion treatment for 1 hour. The treated product was diluted with 250 parts of ethyl acetate. Thus, an application liquid for a charge generating layer was prepared.

The application liquid for a charge generating layer was applied onto the undercoat layer by immersion and then the resultant coating was dried for 10 minutes at 100° C. Thus, a charge generating layer having a thickness of 0.20 μm was formed.

Next, 8 parts of a compound (charge transport material) represented by the following formula and 10 parts of polycarbonate (trade name: Iupilon Z-200, manufactured by MITSUBISHI GAS CHEMICAL COMPANY, INC.) were dissolved in 80 parts of monochlorobenzene. Thus, an application liquid for a charge transport layer was prepared.

The application liquid for a charge transport layer was applied onto the charge generating layer by immersion and then the resultant coating was dried for 1 hour at 110° C. Thus, a charge transport layer having a thickness of 16 μm was formed.

Thus, a cylindrical (drum-shaped) electrophotographic photosensitive member of Example 2-1 was produced.

Examples 2-2 to 2-7

Electrophotographic photosensitive members of Examples 2-2 to 2-7 were produced in the same way as in Example 2-1 except that in Example 2-1, the hydroxygallium phthalocyanine crystal used in the preparation of the application liquid for a charge generating layer was changed to the hydroxygallium phthalocyanine crystals obtained in Examples 1-2 to 1-7.

Comparative Examples 2-1 to 2-3

Electrophotographic photosensitive members of Comparative Examples 2-1 to 2-3 were produced in the same way as in Example 2-1 except that in Example 2-1, the hydroxygallium phthalocyanine crystal used in the preparation of the application liquid for a charge generating layer was changed to the hydroxygallium phthalocyanine crystals obtained in Comparative Examples 1-1 to 1-3.

Evaluations of Examples 2-1 to 2-7 and Comparative Examples 2-1 to 2-3

The electrophotographic photosensitive members of Examples 2-1 to 2-7 and Comparative Examples 2-1 to 2-3 were evaluated for a ghost image under a normal-temperature and normal-humidity environment having a temperature of 23° C. and a relative humidity of 50% RH.

As an electrophotographic apparatus for the evaluation, a laser beam printer (trade name: Color Laser Jet CP3525dn, manufactured by Hewlett-Packard Japan, Ltd.) reconstructed as described below was used. That is, the laser beam printer was reconstructed so as to operate while pre-exposure was not turned on, and a charging condition and a laser exposure value were variable.

In addition, the laser beam printer was reconstructed so as to operate even when any one of the manufactured electrophotographic photosensitive members was mounted onto a process cartridge for a cyan color and the process cartridge was mounted onto a station for the cyan process cartridge, and a process cartridge for any other color was not mounted onto the main body of the laser beam printer.

Upon output of an image, only the process cartridge for a cyan color was mounted onto the main body of the laser beam printer or the main body of a copying machine, and a monochromatic image formed with a cyan toner alone was output. The surface potential of the electrophotographic photosensitive member was set so that a dark portion potential and a light portion potential at an initial stage were −500 V and −100 V, respectively. The surface potential of the electrophotographic photosensitive member upon setting of an electric potential was measured using a process cartridge in which a potential probe (trade name: model 6000B-8, manufactured by TREK JAPAN) was mounted at a development position. In addition, an electric potential at the central portion of the electrophotographic photosensitive member in its longitudinal direction was measured with a surface potentiometer (trade name: model 344, manufactured by TREK JAPAN).

Figure 4:
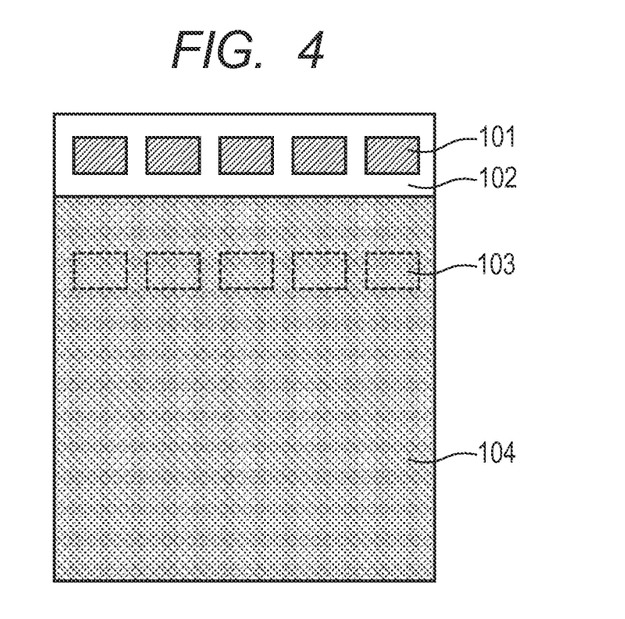
FIG. 4 illustrates an image for ghost evaluation to be used for ghost image evaluation.
Figure 5:
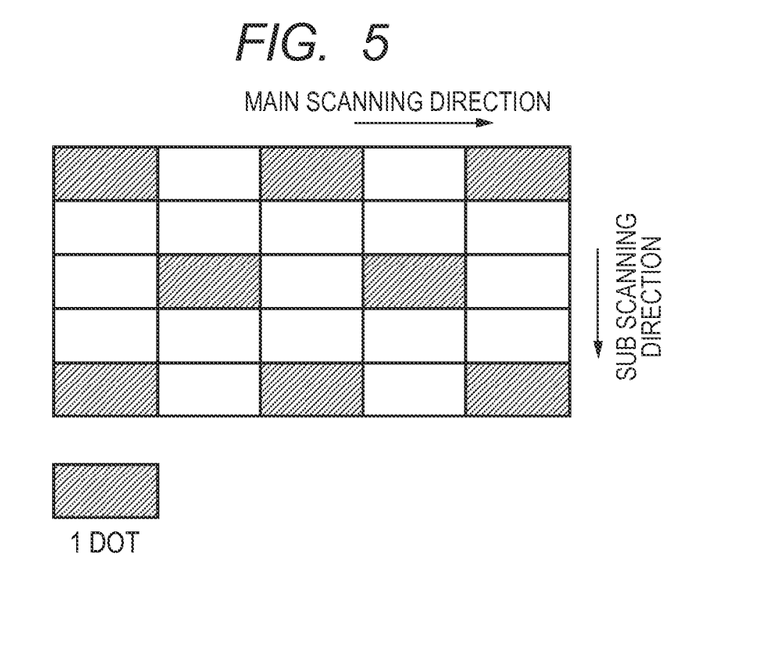
FIG. 5 is a view illustrating a one-dot knight-jump pattern image.

An image for ghost evaluation was formed by outputting square images of solid black 101 into solid white 102 in a leading portion of an image as illustrated in FIG. 4, and then outputting a halftone image 104 of a one-dot knight-jump pattern illustrated in FIG. 5. Images were output in the following order. First, a solid white image was output onto a first sheet, and thereafter five sheets of the image for ghost evaluation were continuously output. Then, one sheet of a solid black image was output, and thereafter five sheets of the image for ghost evaluation were output again. Thus, a total of ten sheets of the image for ghost evaluation were evaluated.

A ghost image was evaluated by measuring a density difference between the density of a one-dot knight-jump pattern image and the density of an image in a ghost portion (portion 103 in which a ghost originated from the solid black 101 may appear) with a spectral densitometer (trade name: X-Rite504/508, manufactured by X-Rite Inc.). One sheet of the image for ghost evaluation was measured at ten points, and an average of the ten points was defined as the result of the one sheet of the image for ghost evaluation. Then, all the ten sheets of the image for ghost evaluation were measured in the same way, and an average value thereof was determined to be a density difference in each example. As the density difference has a smaller value, the degree of a ghost is smaller, which is considered to be more satisfactory. Table 1 shows the results.

As is apparent from Examples 2-1 to 2-7 and Comparative Examples 2-1 to 2-3, the electrophotographic photosensitive members, each of which contains the phthalocyanine crystal containing the compound represented by the formula (1) in the photosensitive layer, can provide an image having a positive ghost image suppressed.

TABLE 1

| | Contained compound | Content mass % | Ghost image density difference |
|---|---|---|---|
| Example 2-1 | N-vinylformamide | 1.8 | 0.033 |
| Example 2-2 | N-vinylformamide | 1.5 | 0.031 |
| Example 2-3 | N-vinylformamide | 2.1 | 0.038 |
| Example 2-4 | N-n-propylformamide | 2.4 | 0.038 |
| Example 2-5 | N-n-propylformamide | 1.6 | 0.035 |
| Example 2-6 | N-n-propylformamide | 1.4 | 0.029 |
| Example 2-7 | N-n-propylformamide | 0.8 | 0.034 |
| Comparative Example 2-1 | — | — | 0.045 |
| Comparative Example 2-2 | — | — | 0.046 |
| Comparative Example 2-3 | — | — | 0.048 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-094017, filed Apr. 30, 2014, and Japanese Patent Application No. 2015-061468, filed Mar. 24, 2015, which are hereby incorporated by reference herein in their entirety.

What is claimed is:

1. An electrophotographic photosensitive member, comprising:
   a support; and
   a photosensitive layer formed on the support, wherein the photosensitive layer includes a phthalocyanine crystal in which a compound represented by the following formula (1) is contained:

(1)

in the formula (1), X represents a vinyl group or a propyl group.

2. An electrophotographic photosensitive member according to claim 1, wherein the phthalocyanine crystal is a gallium phthalocyanine crystal.

3. An electrophotographic photosensitive member according to claim 2, wherein the gallium phthalocyanine crystal is a hydroxygallium phthalocyanine crystal.

4. An electrophotographic photosensitive member according to claim 3, wherein the hydroxygallium phthalocyanine crystal is a hydroxygallium phthalocyanine crystal having peaks at Bragg angles 2θ±0.2° of 7.4° and 28.3° in CuKα characteristic X-ray diffraction.

5. An electrophotographic photosensitive member according to claim 1, wherein a content of the compound represented by the formula (1) is 0.01 mass % or more and 20 mass % or less with respect to the phthalocyanine crystal.

6. An electrophotographic photosensitive member according to claim 1, wherein a content of the compound represented by the formula (1) is 0.1 mass % or more and 1.9 mass % or less with respect to the phthalocyanine crystal.

7. A process cartridge, comprising:
the electrophotographic photosensitive member according to claim 1; and
at least one unit selected from the group consisting of
a charging unit,
a developing unit, and
a cleaning unit,
the electrophotographic photosensitive member and the at least one unit being integrally supported,
wherein the process cartridge is removably mounted onto a main body of an electrophotographic apparatus.

8. An electrophotographic apparatus, comprising:
the electrophotographic photosensitive member according to claim 1;
a charging unit;
an exposing unit;
a developing unit; and
a transferring unit.

9. A phthalocyanine crystal in which a compound represented by the following formula (1) is contained:

(1)

in the formula (1), X represents a vinyl group or a propyl group.

10. A method for producing the phthalocyanine crystal according to claim 9,
the method comprising a step of:
performing crystal transformation of a phthalocyanine by addition the compound represented by the formula (1) thereto with milling treatment.

11. A method for producing the phthalocyanine crystal according to claim 10,
wherein the method further comprises a step of obtaining the phthalocyanine by an acid pasting method before the performing crystal transformation of the phthalocyanine.

12. A method for manufacturing an electrophotographic photosensitive member, the electrophotographic photosensitive member including a support and a photosensitive layer formed on the support,
the method comprising the steps of:
producing the phthalocyanine crystal by the method for producing the phthalocyanine crystal according to claim 10; and
forming a coating of an application liquid for a photosensitive layer containing the phthalocyanine crystal, followed by drying the coating to form the photosensitive layer.

13. A method for manufacturing an electrophotographic photosensitive member, the electrophotographic photosensitive member including a support and a charge generating layer formed on the support,
the method comprising the steps of:
producing the phthalocyanine crystal by the method for producing the phthalocyanine crystal according to claim 10; and
forming a coating of an application liquid for a charge generating layer containing the phthalocyanine crystal, followed by drying the coating to form the charge generating layer.

* * * * *